United States Patent [19]

Mann

[11] 4,425,142
[45] Jan. 10, 1984

[54] PRESSURE SWING ADSORPTION CYCLE FOR NATURAL GAS PRETREATMENT FOR LIQUEFACTION

[75] Inventor: Ray E. Mann, Wheaton, Ill.

[73] Assignee: Chicago Bridge & Iron Company, Oak Brook, Ill.

[21] Appl. No.: 441,482

[22] Filed: Nov. 15, 1982

[51] Int. Cl.³ .............................................. B01D 53/04
[52] U.S. Cl. ......................................... 55/25; 55/33; 55/58; 55/179; 55/195; 55/208; 62/12; 62/18
[58] Field of Search ................... 55/25, 27, 28, 33, 58, 55/75, 179, 195, 208, 389; 62/12, 17, 18

[56] References Cited

U.S. PATENT DOCUMENTS

| | | |
|---|---|---|
| 3,296,773 | 1/1967 | Hemstreet ............................ 55/27 |
| 3,364,654 | 1/1968 | Westbrock ....................... 55/179 X |
| 3,498,025 | 3/1970 | Bedxiarski ....................... 55/58 X |
| 3,768,232 | 10/1973 | Farber et al. ......................... 55/58 |
| 4,008,058 | 2/1977 | Wischer et al. ..................... 55/179 |

Primary Examiner—Robert H. Spitzer
Attorney, Agent, or Firm—Merriam, Marshall & Bicknell

[57] ABSTRACT

An improved apparatus and method for a regeneration of a solid adsorbent used to pretreat a gas before liquefaction. The spent adsorbent is subjected to a two-step regenerative process, in the first of which the adsorbent is subjected to a low pressure produced by the use of mechanical vacuum pumps. When the pressure of the atmosphere in contact with the adsorbent has been reduced to a level sufficiently low to insure that the gas will flow under laminar rather than viscous conditions, the adsorbent is exposed to the action of a cryoplate condenser maintained at a sufficiently low temperature to cause any molecules of water which impinge thereon to condense and freeze, thereby reducing the partial pressure of water vapor within the chamber. The reduced partial pressure of the water vapor in turn causes adsorbed water on the adsorbent to be desorbed, thereby effectively removing the water from the adsorbent and depositing it as solid ice on the cryoplate condenser.

6 Claims, 1 Drawing Figure

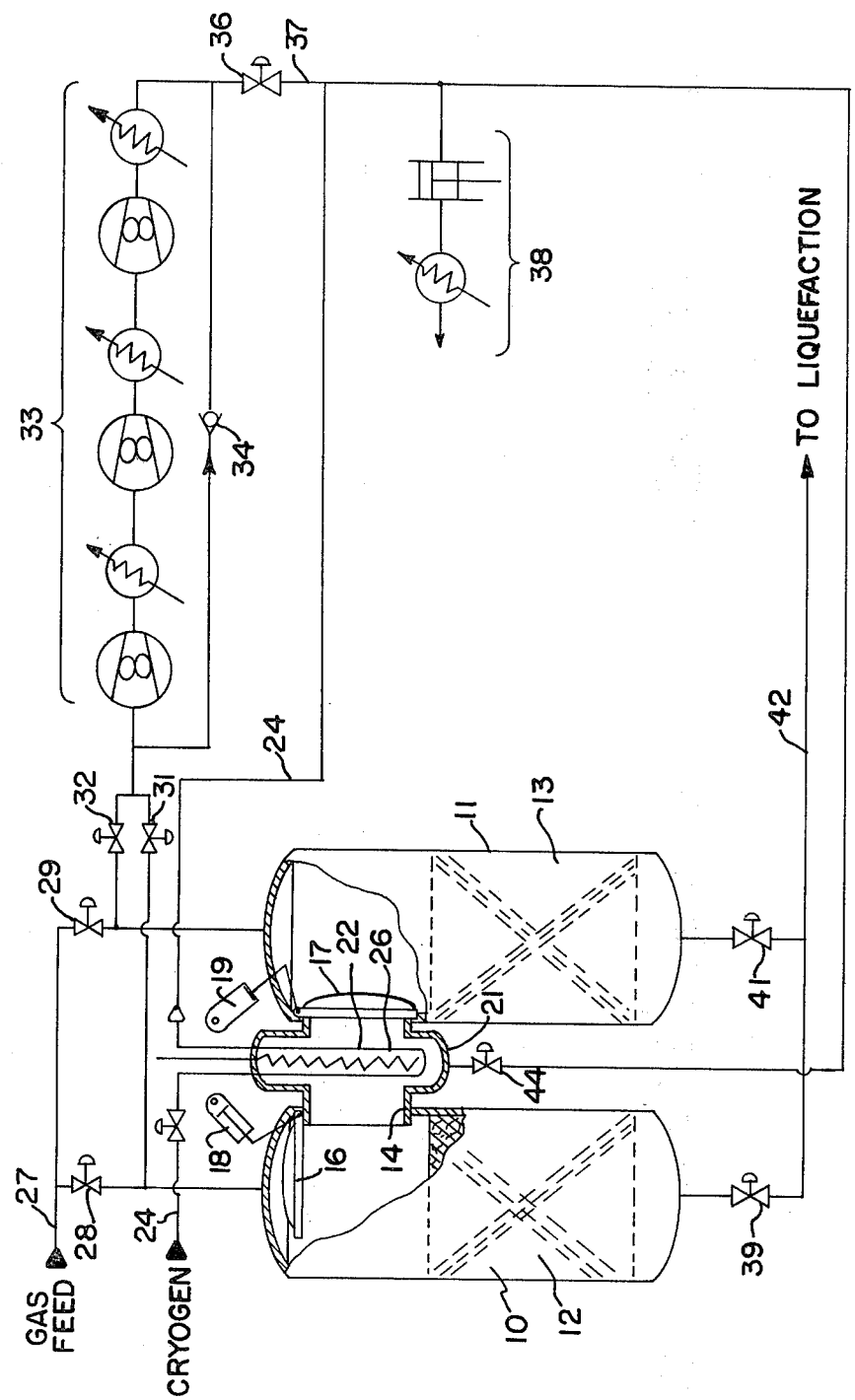

PRESSURE SWING ADSORPTION CYCLE FOR NATURAL GAS PRETREATMENT FOR LIQUEFACTION

This invention relates generally to pretreatment of condensible gases for removal of relatively high boiling components prior to liquefaction, and more specifically to an apparatus and method for such treatment of natural gas prior to liquefaction, employing a solid adsorbent which can be regenerated periodically as required.

BACKGROUND OF THE INVENTION

In the liquefaction of condensible, normally gaseous materials, such as natural gas and air, which exist in the liquid form only at extremely low temperatures, it is common practice to pretreat the gas before liquefaction to remove therefrom any gaseous constituents which, at the low temperature of the liquefied gas, would exist in the solid form and would therefore create operating problems during the liquefaction process as well as in subsequent use of the liquefied material. Natural gas, which consists principally of methane, usually includes minor proportions of water vapor, carbon dioxide and heavier hydrocarbons, all of which freeze at temperatures above that which is required to liquefy the gas. Similarly, air usually contains minor proportions of carbon dioxide and water vapor which must be removed prior to liquefaction.

It is known to remove such constituents, herein referred to as "high boiling constituents", prior to liquefaction of the gas by adsorbing them on solid adsorbents, such as zeolites, in a preliminary step before the gas is fed to the liquefaction plant. Such solid adsorbents, however, eventually become exhausted in their ability to adsorb any additional material and must be regenerated for reuse by removal of the adsorbed materials. It has been proposed to regenerate the exhausted or spent adsorbents by subjecting them to a sufficiently low pressure to cause the desorption of the adsorbed materials therefrom, thus regenerating their adsorptive capacity. The methods heretofore contemplated or proposed for this purpose employed mechanical pumps, which in the large sizes necessary for treating such materials on an industrial scale were incapable of reaching a pressure sufficiently low for substantially complete regeneration of the adsorbent. Although the pressures which could be reached with mechanical vacuum pumps were sufficiently low to cause the desorption of carbon dioxide and hydrocarbons heavier than methane from the solid adsorbent, they were too high to remove water, so that the regeneration of the adsorbent was not complete.

SUMMARY OF THE INVENTION

The present invention provides an improved apparatus and method for a regeneration of a solid adsorbent used to pretreat a gas before liquefaction. In accordance with the invention, the spent adsorbent is subjected to a two-step regenerative process, in the first of which the adsorbent is subjected to a low pressure produced by the use of mechanical vacuum pumps. When the pressure of the atmosphere in contact with the adsorbent has been reduced to a level sufficiently low to insure that the gas will flow under laminar rather than viscous conditions, the adsorbent is exposed to the action of a cryoplate condenser maintained at a sufficiently low temperature to cause any molecules of water which impinge thereon to condense and freeze, thereby reducing the partial pressure of water vapor within the chamber. The reduced partial pressure of the water vapor in turn causes adsorbed water on the adsorbent to be desorbed, thereby effectively removing the water from the adsorbent and depositing it as solid ice on the cryoplate condenser.

DESCRIPTION OF THE DRAWINGS

The invention will be better understood from the detailed description which follows, taken in conjunction with the accompanying drawing, which is a flow diagram showing schematically the process and the apparatus used in the invention.

DETAILED DESCRIPTION OF THE PREFERRED EMBODIMENT

The following discussion describes the use of the method and apparatus of the invention for the pretreatment of natural gas. It should be understood, however, that the invention is not restricted thereto, but can also be used with other gases, such as air, before liquefaction.

The pretreatment of natural gas with a solid adsorbent is in essence a batch process, which must be discontinued when the adsorbent becomes saturated. In order to permit continuous operation, the system of the invention employs two parallel adsorbers, one of which is used to treat gas while the other is being regenerated, the gas flowing through the adsorbers alternately in a cyclic manner. As shown, parallel contact chambers 10 and 11, each containing a bed 12, 13 of a natural or synthetic zeolite or other material suitable for reversibly adsorbing water, carbon dioxide, higher hydrocarbons, or any other high boiling constituents in the gas, are interconnected for fluid flow by a cryoplate conduit 14 having a cross-sectional area sufficiently large to accommodate the volume of the evolved water vapor at the low pressure at which it is evolved from the adsorbent. Flapper valves 16 and 17, independently controlled by valve operators 18 and 19 respectively, are designed to seal the respective ends of conduit 14 with increasing force as the pressure within the associated chamber increases, so that the flapper valve cannot be inadvertently opened when substantial pressure exists within the chamber.

Intermediate the ends of conduit 14 and in fluid communication therewith is a cryoplate housing 21 enclosing a cryoplate condenser 22, e.g., a metal plate which can be cooled to a sufficiently low temperature to cause the condensation of condensible gases which impinge on its surface. Cryoplate 22 is maintained at a suitably low temperature by a stream of a liquid cryogen supplied through line 24. The liquid cryogen is preferably the liquid material, e.g., natural gas, produced in the liquefaction plant with which the system of the invention is associated, although any other appropriate refrigeration means for cooling the cryoplate can also be used. Also associated with cryoplate 22 is an electrical heater 26 which can be energized periodically as necessary to melt the water which condenses and freezes on the cryoplate.

The feed gas to be treated, under available pressure, typically about 500–600 psi, is supplied to chambers 10 and 11 through line 27 and valves 28 and 29. Connected through valves 31 and 32 to the respective gas feed lines leading to chambers 10 and 11 is a mechanical vacuum pump system 33, shown as having three stages with interstage cooling and a bypass line incorporating a check-valve 34. In general, any vacuum pump capable of exhausting the chambers to a pressure sufficiently low to permit the flow of water vapor to approach the region of free molecular flow, generally below about 0.1 mm Hg, can be used. The output of the pump system 33, controlled by valve 36, passes via line 37 to the input of a conventional compressor 38, the output of which is connected to any system which requires a supply of gas, such as a gas distribution system, a power plant, a furnace, or the like.

Valves 39 and 41 control the flow of gas leaving chambers 10 and 11, respectively, the treated gas passing through line 42 to a liquefaction plant (not shown).

In use, the system of the invention operates as follows. With valves 29 and 41 open, valves 28 and 39 closed, and flapper valve 17 closed as shown in the FIGURE, a stream of natural gas passes through chamber 11, zeolite bed 13, valve 41 and line 42 to the liquefaction plant. The water vapor, carbon dioxide and heavier hydrocarbons are removed from the gas stream during this phase of the operation and are adsorbed on adsorbent bed 13.

While chamber 11 is operating for removal of the high boiling constituents, chamber 10, which had previously been employed in a similar manner until the adsorptive capacity of its adsorbent bed was essentially exhausted, is regenerated.

At the start of the regeneration cycle, previously opened valves 28 and 39 are closed (flapper valve 16 having previously been closed) and chamber 10 is depressurized through valves 31, 34 and 36 to compressor 38. When the pressure in chamber 10 approaches atmospheric, flapper valve 16 is opened (flapper valve 17 being closed since chamber 11 is under pressure), and pump system 33 is energized to reduce the pressure within chamber 10 to a value sufficiently low to cause the desorption of carbon dioxide and heavy hydrocarbons from adsorbent bed 12, e.g., about 0.1 mm Hg. At the low pressure conditions which now exist in chamber 10, cryoplate 22, maintained at a low temperature by the liquid cryogen vaporizing therein, functions as a vacuum pump, causing water vapor within chamber 10 to freeze on its surface, thereby reducing the vapor pressure of water in contact with bed 12 and causing the desorption of the adsorbed water therein. After a suitable period of time, substantially all of the water adsorbed on the adsorbent is desorbed and collects as a layer of ice on the surface of the cryoplate.

At this time, adsorbent bed 12 is ready for recycling, whereupon valve 31 is closed and valve 28 is opened slightly to allow the natural gas to enter chamber 10 slowly. When the pressure within chamber 10 reaches a value somewhat above atmospheric, flapper 16 is closed and valve 28 is opened fully to allow chamber 10 to pressure up to the full pressure of the natural gas feed, whereupon valve 39 is opened and treatment of the gas with the adsorbent in chamber 10 proceeds.

During the period of repressurization of chamber 10, the flow of cryogen to cryoplate 22 is stopped by means of valve 43, and heater 26 is energized to cause the layer of ice which had accumulated on cryoplate 22 to melt and accumulate in the bottom of housing 21. Previously closed valve 44 is thereupon opened and the superatmospheric residual pressure within cryoplate conduit 22, both ends of which are closed by flapper valves 16 and 17, is used to blow the accumulated water to the inlet of compressor 38, where it mixes with the stream of gas resulting from the depressurization of chamber 11.

When chamber 10 is brought into full operation, chamber 11 is depressurized through valves 32, 34, and 36 to the inlet of compressor 38, until the pressure within chamber 11 falls sufficiently to permit opening flapper valve 17, at which time mechanical pump system 33 lowers the pressure within chamber 11 to cause desorption of carbon dioxide and heavy hydrocarbons, and cryoplate 22, which is again cooled by liquid cryogen, functions to desorb the water from the adsorbent bed 11, as previously described in connection with chamber 10.

It will be seen that by suitable control of the gas streams through the system, it is possible to maintain a continuous flow of gas through one of the chambers for removal of high boiling constituents, while regenerating the other chamber so that a continuous source of treated natural gas can be supplied to the liquefaction plant.

The foregoing detailed description has been given for clearness of understanding only, and no unnecessary limitations should be understood therefrom as modifications will be obvious to those skilled in the art.

What is claimed is:

1. A system for removal of relatively high boiling constituents from a condensible gas comprising:
   an evacuable contact chamber;
   a solid adsorbent within said chamber adapted to adsorb said high boiling constituents;
   first conduit means for introducing a stream of said gas containing said constituents into said chamber for contact with said adsorbent;
   second conduit means for permitting said stream to leave said chamber after contact with said adsorbent;
   a cryoplate housing in fluid communication with said chamber;
   a cryoplate within said housing;
   valve means for hermetically sealing said housing;
   means for supplying a liquid cryogen to said cryoplate; and
   mechanical vacuum pump means for evacuating said chamber;
   means for heating said cryoplate to remove said constituents which have condensed thereon.

2. A system for continuously removing relatively high boiling constituents from a stream of a condensible gas comprising:
   a pair of evacuable contact chambers;
   a solid adsorbent for said constituents within each of said chambers;
   first conduit means for introducing said stream selectively into either of said chambers for contact with said adsorbent;
   second conduit means for permitting said stream to leave said chambers after contact with said adsorbent;
   third conduit means interconnecting the interiors of said chambers;
   a cryoplate condenser within said third conduit means and in communication with a fluid flowing therein;
   refrigeration means for cooling said cryoplate condenser;
   valve means associated with each end of said third conduit means;
   heating means for removing condensed high boiling constituents from said cryoplate condenser; and mechanical vacuum pump means for evacuating said chambers.

3. The system of claim 2 wherein said refrigeration means is a liquid cryogen.

4. The system of claim 3 wherein said cryogen is liquid natural gas.

5. The system of claim 1 wherein said mechanical vacuum pump is capable of maintaining a gas pressure less than about 0.1 mm Hg in said chambers.

6. A process for removal of water vapor, carbon dioxide and relatively heavy hydrocarbons from a stream of natural gas comprising:

passing said stream in contact with a solid adsorbent for said constituents until the adsorptive capacity of said adsorbent is substantially exhausted;

isolating said adsorbent from said stream;

reducing the gas pressure in contact with said adsorbent to a value below about 0.1 mm Hg by means of a mechanical vacuum pump to cause the desorption of carbon dioxide and hydrocarbons from said adsorbent;

exposing said adsorbent to a cryoplate condenser maintained at a temperature sufficiently low to condense water vapor thereon for a time sufficient to desorb substantially all adsorbed water from said adsorbent, and recycling said adsorbent.

* * * * *

UNITED STATES PATENT AND TRADEMARK OFFICE
CERTIFICATE OF CORRECTION

PATENT NO. : 4,425,142
DATED : January 10, 1984
INVENTOR(S) : RAY E. MANN

It is certified that error appears in the above-identified patent and that said Letters Patent are hereby corrected as shown below:

Col. 4, line 41, delete "and".

Col. 4, line 43, after "chamber;" insert --and--.

Signed and Sealed this

Third Day of July 1984

[SEAL]

*Attest:*

*Attesting Officer*

GERALD J. MOSSINGHOFF

*Commissioner of Patents and Trademarks*